Sept. 15, 1942.   D. HOPPENSTAND   2,295,900
RIVET AND SPRING LOCKING BUTTON THEREFOR
Filed May 14, 1940

INVENTOR
David Hoppenstand
by his attorneys
Stebbins and Blenko

Patented Sept. 15, 1942

2,295,900

UNITED STATES PATENT OFFICE 2,295,900

RIVET AND SPRING LOCKING BUTTON THEREFOR

David Hoppenstand, Fox Chapel, Pa., assignor to Mechanical Laboratories, Inc., Pittsburgh, Pa., a corporation of Pennsylvania Application May 14, 1940, Serial No. 335,023

1 Claim. (Cl. 85—35)

This invention relates to a fastening device and, in particular, to a rivet or the like especially suited for securing relatively light members together, for applications where the maximum resistance to separation is not required.

Various forms of securing devices for light members have been proposed heretofore and it is the general object of the invention to provide an improved fastener of this general type and particularly, to provide a fastener having a finished appearance at all portions thereof which are exposed. In a preferred embodiment of the invention, I provide a rivet stud having a head and a shank, the shank being tapered toward the end and provided with a plurality of parallel grooves. A spring-locking member adapted to cooperate with the tapered, grooved end of the shank has the form of a spherical segment and is provided with inwardly extending spring-locking lugs for cooperation with the grooves to hold the rivet stud and locking member together.

The invention will be described in greater detail hereinafter and the advantages and novel features thereof particularly pointed out with reference to the accompanying drawing illustrating a preferred embodiment. In the drawing, Fig. 1 is a central section through the fastener of my invention showing the rivet stud in elevation;

Figure 1:
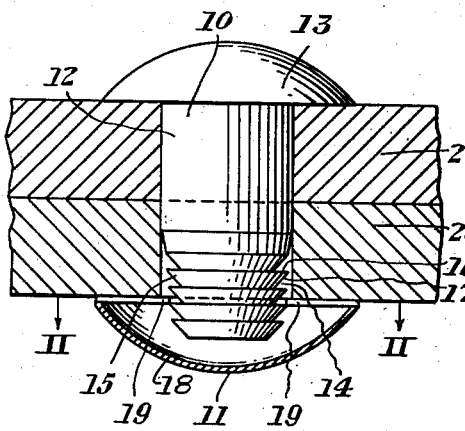

Referring now in detail to the drawing, my fastener comprises a rivet stud 10 and a spring-locking member 11. The stud 10 has a shank 12 and a head 13 formed thereon. The shank 12 tapers toward the end thereof and is provided with a plurality of parallel grooves 14. Shoulders 15 are formed between the grooves 14 and are defined by a surface 16 generally normal to the axis of the rivet shank and a frusto-conical surface 17 converging toward the end of the shank.

The locking member 11 is preferably made of thin sheet steel and has an exterior 18 with the shape of a spherical segment. Locking lugs 19 extend inwardly from the opposite edges of the exterior or shell 18, for cooperation with the shank of the rivet stud. The lugs 19 are integral with the shell and are preferably notched as at 20 receive the shank 12. The locking member 11 may be made by suitable stamping and die-forming operations on soft sheet steel and is thereafter hardened to give it the requisite springy quality.

Figure 3:
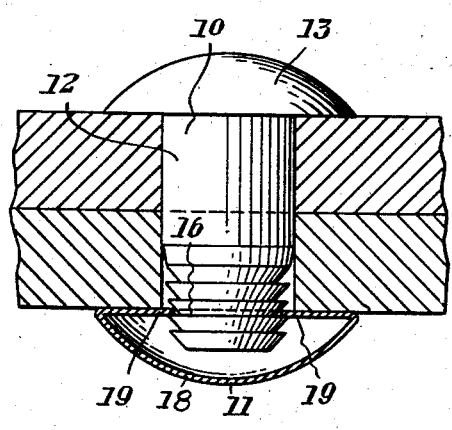
Fig. 3 is sectional view taken along the plane of line III—III of Fig. 2.
Figure 2:
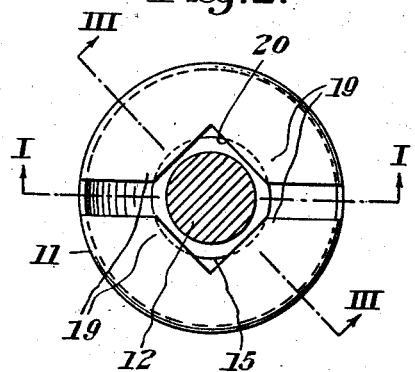
Fig. 2 is a transverse sectional view taken substantially along the plane of line II—II of Fig. 1; line I—I of Fig. 2 indicates the plane on which the section of Fig. 1 was taken.
Figure 4:
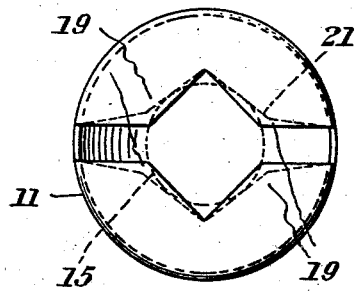
Fig. 4 is a plan view of the spring-locking member alone.

As shown in Fig. 2, the distance between opposite sides of the rectangular opening provided by the notches 20 is slightly less than the maximum diameter of the shoulders 15. Thus, when the locking member 11 is pressed onto the end of the shank 12, the locking lugs are displaced inwardly as indicated at 21 in Fig. 4 until they snap past the maximum diameter portion of the shoulders 15. Thereafter, the lugs engage behind the shoulders as clearly shown in Figs. 2 and 3 and prevent separation of the locking member from the stud.

The fastener may be employed for any application involving the joining of a plurality of members. As one example, we have shown lapped thicknesses 22 and 23, e. g., of sheet metal, fabric or the like, punched to receive the shank 12. When the shank of the rivet stud is inserted through the thicknesses of material and the locking member 11 pressed on the tapered end, the layers of material are tightly and permanently clamped together.

The invention has numerous advantages. In the first place, the taper of the shank of the stud is such that the fastener holds tighter, the farther the shank is forced into the shell or locking member 11. The locking member, furthermore will not become separated from the rivet stud when subjected to vibration even though relative rotation of the parts occurs. The invention thus overcomes the serious objection to sheet metal nuts used with conventional screws. While the locking member can be separated from the rivet stud, if sufficient force is brought to bear, the fastener has ample strength for numerous applications where the parts joined together are subjected to little or no tension. The construction of the device, furthermore, is such that it may be manufactured in quantity at relatively low cost.

A further advantage has already been mentioned, i. e., the fact that the spring-locking member 11 has a smooth, finished exterior which is desirable where both sides of the joint are exposed, and avoids the sharp points or edges characterizing previous fasteners of the same general type.

Although I have illustrated and described but a preferred embodiment of the invention, it will be understood that changes may be made in the shape and arrangement of the parts without departing from the spirit of the invention or the scope of the appended claim.

I claim:

A spring locking button adapted to be pressed onto the shank of a headed fastener having circumferential shoulders, said button comprising an exterior portion having the shape of a spherical segment, and a pair of locking lugs integral therewith and extending inwardly from the edge thereof, said lugs being generally semi-circular and each having a V-shaped notch adjacent the center of its free edge, thereby providing yieldable points engageable behind said shoulders to prevent removal of said button from said fastener.

DAVID HOPPENSTAND.